US 8,269,715 B2

(12) United States Patent
Lowles et al.

(10) Patent No.: US 8,269,715 B2
(45) Date of Patent: Sep. 18, 2012

(54) BACKLIGHT CONTROL FOR A PORTABLE COMPUTING DEVICE

(75) Inventors: Robert J. Lowles, Waterloo (CA); Marc A. Drader, Kitchener (CA); James Robinson, Elmira (CA)

(73) Assignee: Research In Motion Limited, Waterloo, Ontario (CA)

(*) Notice: Subject to any disclaimer, the term of this patent is extended or adjusted under 35 U.S.C. 154(b) by 1052 days.

(21) Appl. No.: 11/066,447

(22) Filed: Feb. 28, 2005

(65) Prior Publication Data
US 2006/0192748 A1   Aug. 31, 2006

(51) Int. Cl.
*G09G 3/36* (2006.01)
(52) U.S. Cl. .......................................... 345/102; 345/87
(58) Field of Classification Search ........... 345/102–104
See application file for complete search history.

(56) References Cited

U.S. PATENT DOCUMENTS

| | | | | |
|---|---|---|---|---|
| 5,247,700 | A * | 9/1993 | Wohl et al. ................. | 455/552.1 |
| 5,850,205 | A * | 12/1998 | Blouin ........................ | 345/102 |
| 6,798,395 | B1 | 9/2004 | Yamauchi et al. | |
| 2002/0050975 | A1 * | 5/2002 | Knox et al. .................. | 345/102 |
| 2003/0137527 | A1 * | 7/2003 | Lin et al. ..................... | 345/698 |
| 2003/0210221 | A1 * | 11/2003 | Aleksic ........................ | 345/102 |
| 2004/0008154 | A1 * | 1/2004 | Miyata et al. ................ | 345/1.1 |
| 2004/0196252 | A1 | 10/2004 | Kim | |

FOREIGN PATENT DOCUMENTS

| | | |
|---|---|---|
| GB | 2391752 B1 | 2/2004 |
| JP | 2004/357193 B1 | 12/2004 |
| KR | 102000061851 A | 10/2000 |
| KR | 102003000200 A | 1/2003 |
| KR | 102004059035 A | 7/2004 |
| WO | WO00/41379 B1 | 7/2000 |

OTHER PUBLICATIONS

Patent Abstracts of Japan vol. 2003, No. 12, Dec. 5, 2003 & JP 2004 096593 A (Hitachi Ltd.), Mar. 25, 2004 Abstract; paragraphs 0002; 0011-0014; 0022-0024; figures 1, 2, 3, 4, 13-15.

* cited by examiner

*Primary Examiner* — Kevin M Nguyen
*Assistant Examiner* — Cory Almeida
(74) *Attorney, Agent, or Firm* — McCarthy Tétrault LLP

(57) ABSTRACT

In a portable computing device that includes a backlit device having a variable-intensity backlight, a light sensor, and a light controller coupled to the light sensor and the backlight, a method for controlling the intensity of light produced by the backlight involves the steps of (1) with the ambient light sensor determining the ambient light level at the computing device; and (2) with the light controller automatically adjusting the intensity of light produced by the backlight in accordance with the determined light level.

9 Claims, 7 Drawing Sheets

BACKLIGHT CONTROL FOR A PORTABLE COMPUTING DEVICE

FIELD OF THE INVENTION

The invention described herein relates to a mechanism for enhancing the ease of use of a portable computing device. In particular, the invention described herein relates to a method and system for enhancing the clarity of information presented on a backlit display of a portable computing device.

BACKGROUND OF THE INVENTION

The conventional portable computing device, such as a laptop computer, a PDA, or a wireless telephone, includes a Liquid Crystal Display (LCD) display for presenting information to the user, and a keyboard or keypad for facilitating data entry by the user. Typically, the LCD display comprises a transmissive LCD panel, and a backlight for enhancing the visibility of the information presented on the LCD panel. The intensity of the light produced by the LCD backlight is set by the manufacturer such that the information presented on the LCD panel is clear at moderate ambient light levels. However, this factory setting often renders the LCD panel difficult to read in dim light (because the backlight is too bright, thereby effectively "blinding" the user of the portable computing device) and strong ambient light (because the backlight is too dim).

In some implementations, instead of a transmissive LCD panel, the LCD display comprises a reflective or a transreflective LCD panel, and a backlight for enhancing the visibility of the information presented on the LCD panel. Due to the reflective nature of the LCD panel, the clarity of the information presented on the LCD panel is clearest in strong ambient light. Further, the intensity of the light produced by the LCD backlight is set by the manufacturer such that the information presented on the LCD panel is clear at moderate ambient light levels. However, this factory setting often renders the LCD panel difficult to read in dim ambient light because the backlight in effect "blinds" the user of the portable computing device.

Similarly, the keyboard or keypad on such devices typically includes a set of keys, and a backlight for enhancing the visibility of the information presented on the surface of the keys. The intensity of the light produced by the keyboard/keypad backlight is set by the manufacturer such that the information presented on the keys is clear in moderate ambient light levels. However, this factory setting often renders the keys difficult to read in dim ambient light because the backlight "blinds" the user of the portable computing device.

Therefore, there is a need for a portable computing device whose LCD display (and optionally its keyboard/keypad) is readable in strong, moderate and dim ambient light.

SUMMARY OF THE INVENTION

According to the invention described herein, in a portable computing device that includes a variable-intensity backlight, the intensity of light produced by the backlight is adjusted automatically in accordance with the intensity of ambient light at the computing device.

According to one aspect of the invention described herein, there is provided a portable computing device that includes a display device having a variable-intensity backlight, a light sensor for determining the ambient light level at the computing device, and a light controller coupled to the backlight and the light sensor for automatically adjusting the intensity of light produced by the backlight in accordance with the determined light level.

The light controller is configured to set the intensity of light (i) to a first intensity when the determined light level is greater than a first threshold, (ii) to a second level less than the first intensity when the determined light level is not greater than the first threshold, and (iii) to a third intensity less than the second intensity when the determined light level is less than a second threshold. If the display device comprises a transmissive LCD display, the second threshold is less than the first threshold. If the display device comprises one of a reflective and a trans-reflective LCD display, the second threshold is not less than the first threshold.

According to another aspect of the invention described herein, in a portable computing device that includes a backlit device having a variable-intensity backlight, a light sensor and a light controller coupled to the light sensor and the backlight, there is provided a method for controlling the intensity of light produced by the backlight that involves the steps of (1) with the light sensor determining the ambient light level at the computing device; and (2) with the light controller automatically adjusting the intensity of light produced by the backlight in accordance with the determined light level.

This latter step involves automatically (i) setting the backlight intensity to a first intensity when the determined light level is greater than a first threshold, (ii) setting the backlight intensity to a second level less than the first intensity when the determined light level is not greater than the first threshold, and (iii) setting the backlight intensity to a third intensity less than the second intensity when the determined light level is less than a second threshold. If the display device comprises a transmissive LCD display, the second threshold is less than the first threshold. If the display device comprises one of a reflective and a trans-reflective LCD display, the second threshold is not less than the first threshold.

In one variation, the portable computing device includes a backlit data entry device. The intensity adjusting step involves (i) illuminating the data entry device at a first keyboard intensity when the determined light level is greater than the first threshold, and (ii) otherwise illuminating the data entry device at a second keyboard intensity less than the first keyboard intensity.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
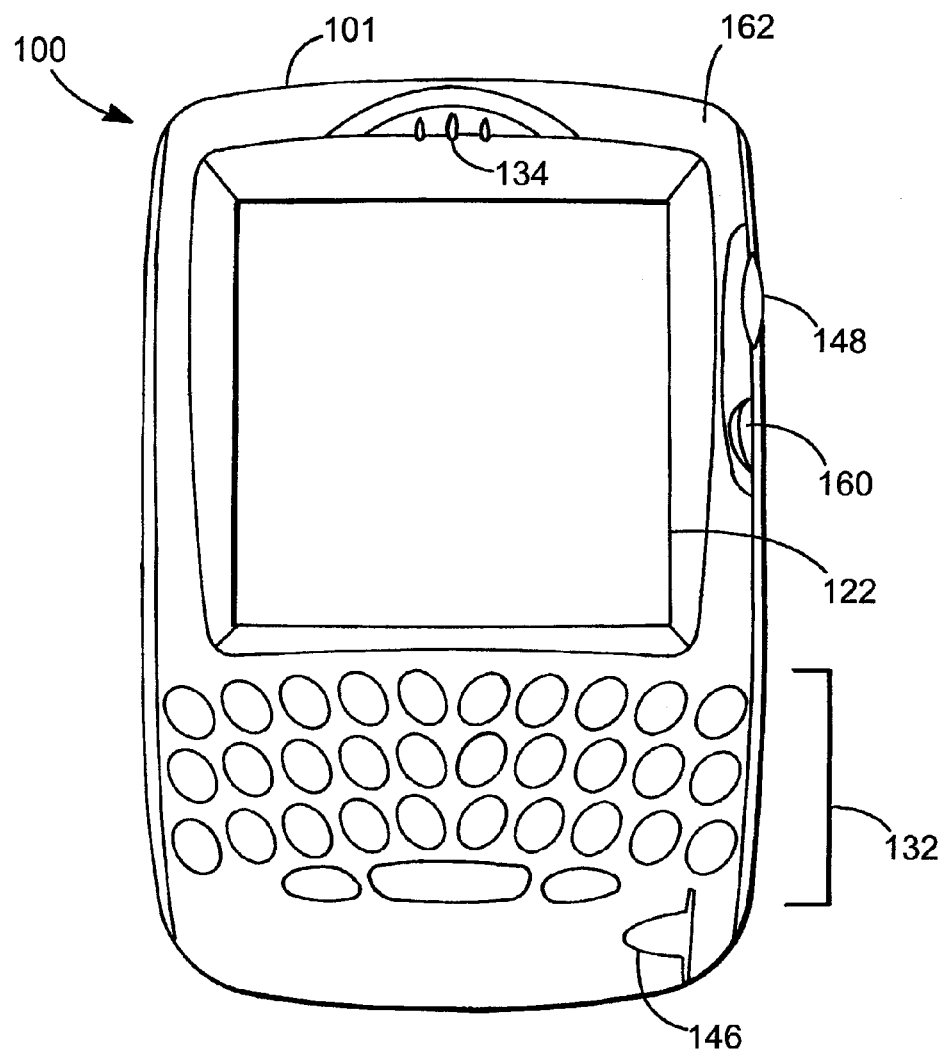
FIG. 1 is a front plan view of a portable computing device, according the invention described herein, depicting the display, the ambient light sensor, and the data input means.

Referring now to FIG. 1, there is shown a portable computing device, denoted generally as 100, provided according to one aspect of the invention. The portable computing device 100 includes a display 122, a function key 146, an ambient light sensor 162, and data processing means 102 (not shown) disposed within a common housing 101. The display 122 comprises a backlit display having a variable-intensity backlight, and the data processing means 102 is coupled to the backlight of the display 122 for controlling the intensity of light produced by the backlight.

In one embodiment, the backlit display 122 comprises a backlit transmissive LCD display, and the function key 146 operates as a combination power on/off switch and display backlight on/off switch. Alternately, in another embodiment, the backlit display 122 comprises a backlit reflective or transreflective LCD display, and the function key 146 operates as a master backlight on/off switch.

Figure 2:
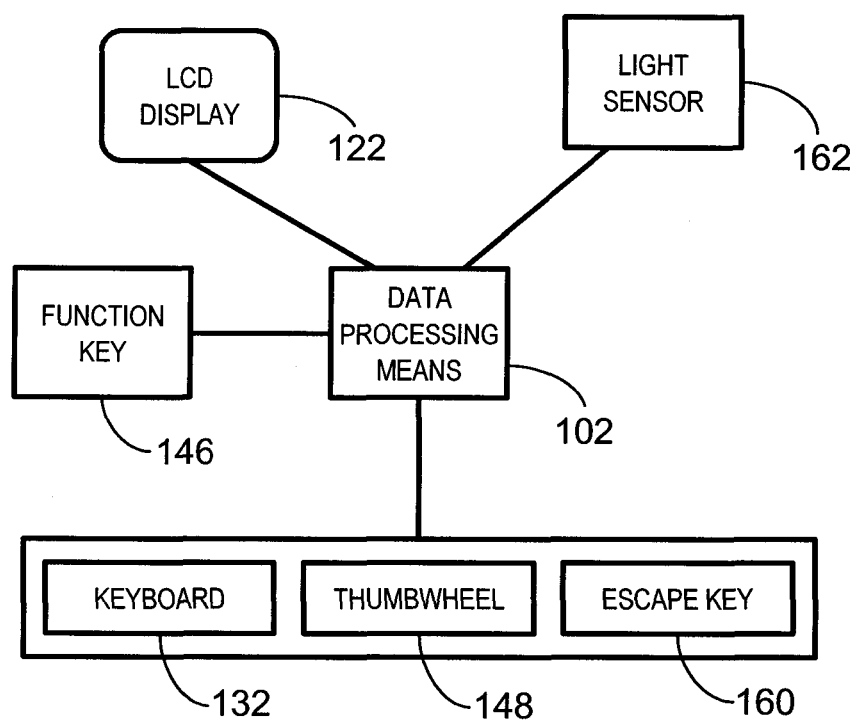
FIG. 2 is a schematic view depicting the communication pathways existing between the data processing means, the display, the ambient light sensor and the data input means of the portable computing device depicted in FIG. 1.

As shown in FIG. 2, the data processing means 102 of the the portable computing device 100 is in communication with the display 122 and the ambient light sensor 162. As will be described, the data processing means comprises a microprocessor 138, and a memory 124, 126 (disposed within the housing). The memory 124, 126 carries computer processing instructions which, when accessed from the memory 124, 126 and executed by the microprocessor 138, cause the data processing means to perform the method which will be described in further detail below. The computer instructions may be provided on a computer-readable medium. The computer-readable medium may be transitory or non-transitory.

In addition to the display 122 and the ambient light sensor 162, the portable computing device 100 includes user data input means for inputting data to the data processing means. Further, the data processing means 102 is in communication with the user data input means. Preferably, the user data input means includes a keyboard/keypad 132, a thumbwheel 148 and an escape key 160. Preferably, the keyboard 132 comprises a backlit keyboard. Further, preferably the backlight for the keyboard 132 is operable independently of the backlight for the display 122.

As shown in FIG. 1, the ambient light sensor 162 is disposed proximate the display 122, to thereby detect the intensity of ambient light falling on the display 122. Preferably, the ambient light sensor 162 is disposed above the display 122, adjacent the uppermost end of the portable computing device 100. Optionally, the ambient light sensor 162 may be disposed below the display 122, between the lowermost end of the display 122 and the uppermost end of the keyboard 132.

Typically, the portable computing device 100 is a two-way wireless communication device having at least voice and data communication capabilities. Further, preferably the portable computing device 100 has the capability to communicate with other computer systems on the Internet. Depending on the exact functionality provided, the wireless portable computing device 100 may be referred to as a data messaging device, a two-way pager, a wireless e-mail device, a cellular telephone with data messaging capabilities, a wireless Internet appliance, or a data communication device, as examples.

Figure 3:
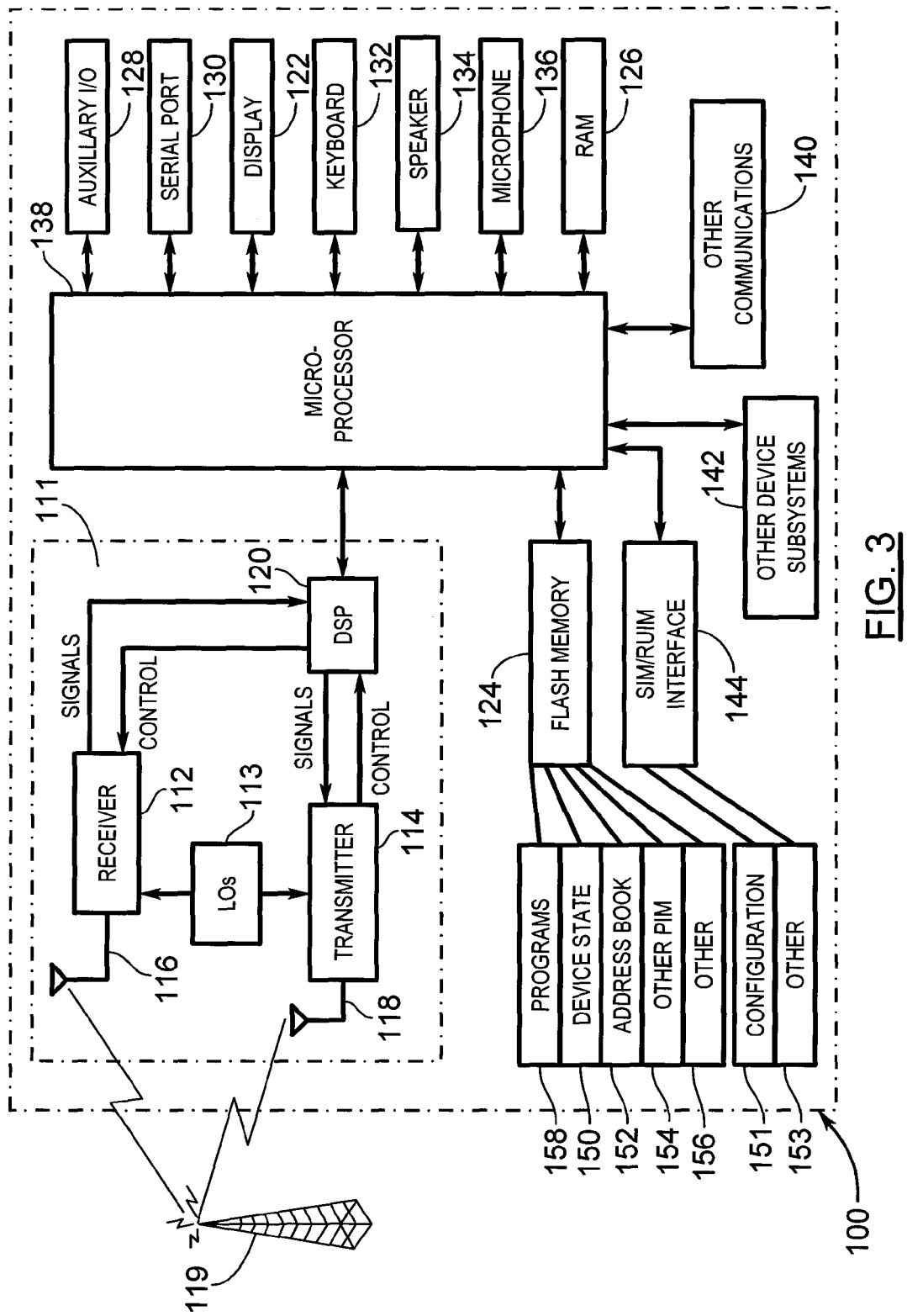
FIG. 3 is a schematic view depicting functional details of the portable computing device.

FIG. 3 depicts functional details of the portable computing device 100. Where the portable computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the portable computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the portable computing device 100 is registered on the network using a unique identification number associated with each portable computing device. In UMTS and GPRS networks, and in some CDMA networks, however, network access is associated with a subscriber or user of the portable computing device 100. A GPRS portable computing device therefore requires a subscriber identity module (SIM) card in order to operate on a GPRS network, and a RUIM in order to operate on some CDMA networks. Without a valid SIM/RUIM card, a GPRS/UMTS/CDMA portable computing device may not be fully functional. Local or non-network communication functions, as well as legally required functions (if any) such as "911" emergency calling, may be available, but the portable computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the portable computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The portable computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 3 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. The operating system software comprises computer processing instructions which, when accessed from the flash memory 124 and the RAM 126 and executed by the microprocessor 138, define the aforementioned data processing means 102. Received communication signals may also be stored in RAM 126.

As shown, the flash memory 124 can be segregated into different areas for both computer programs 158 and program data storage 150, 152, 154 and 156. These different storage types indicate that each program can allocate a portion of flash memory 124 for their own data storage requirements.

Microprocessor 138, in addition to its operating system functions, preferably enables execution of software applications on the portable computing device. A predetermined set of applications that control basic operations, including at least data and voice communication applications for example, will normally be installed on the portable computing device 100 during manufacturing.

Figure 4:
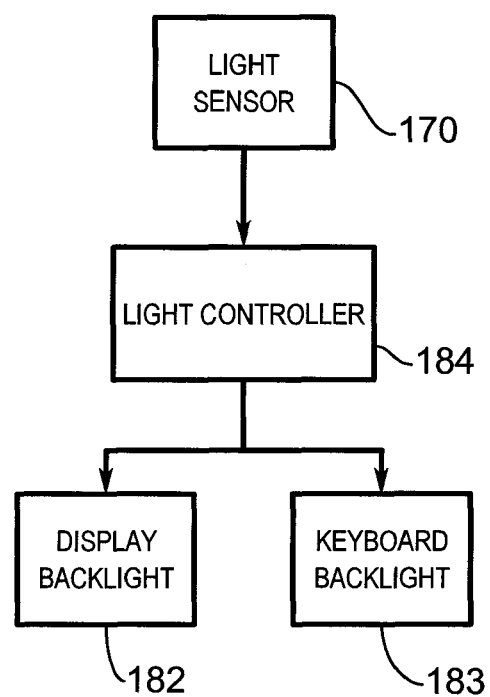
FIG. 4 is a schematic view depicting the communication pathways existing between the light controller, the display device backlight and the keyboard backlight of the portable computing device.

Another such software application comprises a light controller 184 that controls the backlight of the backlit display 122. As shown in FIG. 4, the light controller 184 is in communication with the light sensor 162, and the display backlight 182 and the keyboard backlight 183. The light controller 184 uses the light sensor 162 to determine the intensity of ambient light external to the housing 101. Also, the light controller 184 is configured to adjust the intensity of light emitted by the display backlight 182 and the keyboard backlight 183 in accordance with the determined ambient light intensity.

The display backlight 182 includes one or more light emitting diodes (LEDs) that are used to illuminate the display 122. The brightness of the light produced by the LEDs diminishes over time as the LEDs age. As a result, a LED typically has an associated set of performance curves that summarizes, for a range of drive currents, the expected brightness of the LED as it ages. The time required for the brightness of a LEDs to drop to 50% of its initial value is referred to as the "time to half brightness" of the LED.

As a result, the display backlight 182 will have a "normal" intensity level for which the time to half brightness is greater than the expected mean time between failure (MTBF) for portable computing device 100. As will be discussed below, the light controller 184 is configured to set the intensity of light emitted by the display backlight 182 to the "normal" intensity level, an "overdrive" level which is greater than the "normal" intensity level, and a "dim" level which is less than the "normal" intensity level. The "overdrive" intensity level is greater than the normal intensity level and is typically used for short periods of time since it reduces the "time to half brightness" for the display backlight 182.

Returning again to FIG. 3, another software application may be a personal information manager (PIM) application having the ability to organize and manage data items relating to the user of the portable computing device such as, but not limited to, e-mail, calendar events, voice mails, appointments, and task items. Naturally, one or more memory stores would be available on the portable computing device to facilitate storage of PIM data items. Such PIM application would preferably have the ability to send and receive data items, via the wireless network 119.

In a preferred embodiment, the PIM data items are seamlessly integrated, synchronized and updated, via the wireless network 119, with the user's corresponding data items stored or associated with a host computer system. Further applications may also be loaded onto the portable computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the portable computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the portable computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the portable computing device 100 is similar, except that received signals would preferably be output to a speaker 134 and signals for transmission would be generated by a microphone 136. Alternative voice or audio I/O subsystems, such as a voice message recording subsystem, may also be implemented on the portable computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 3, would normally be implemented in a personal digital assistant (PDA)-type portable computing device for which synchronization with a user's desktop computer (not shown) may be desirable, but is an optional device component. Such a port 130 would enable a user to set preferences through an external device or software application and would extend the capabilities of the portable computing device 100 by providing for information or software downloads to the portable computing device 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between the portable computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 5:
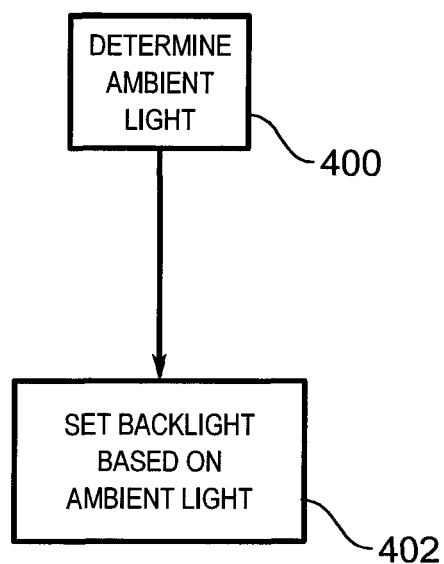
FIG. 5 is a flowchart depicting, by way of overview, the method of backlight control implemented in the portable computing device.

FIG. 5 is a flow chart that depicts, by way of overview, the sequence of steps performed by the data processing means 102 according to the invention. Initially, the portable computing device 100 is in an inactive state, and the display backlight 182 and the keyboard backlight 183 are at a minimum/off intensity. The portable computing device 100 remains in the inactive state until the data processing means 102 detects a data event. Suitable data events include activity at the data input means (pressing a key on the keyboard 132, rotating the thumbwheel 148 or depressing the escape key 160), an incoming message (such as a telephone call or e-mail message), or a predetermined event (such as a scheduled meeting or task).

When the data processing means 102 exits from the inactive state, at step 400 the data processing means 102 determines the ambient light level at the computing device, via the ambient light sensor 162. Then, at step 402, the data processing means 102 sets the intensity of the display backlight 182 to an intensity level that is sufficient for viewing information on the display 122 under the determined lighting conditions. Typically, this latter step involves automatically setting the intensity of light to a first intensity when the determined light level is greater than a first level, and automatically setting the intensity of light to a second intensity less than the first intensity when the determined light level is less than the first level.

In one embodiment, the backlit display 122 is a transmissive LCD display, and the intensity adjusting step also involves setting the intensity of light to a third intensity less than the second intensity when the determined light level is less than a second level, the second level being lower than the first level. In another embodiment, the backlit display 122 is a reflective or trans-reflective LCD display, and the intensity adjusting step also involves setting the intensity of light to a third intensity less than the second intensity when the determined light level is greater than a second level, the second level being greater than the first level.

In one variation of these embodiments, the intensity adjusting step involves illuminating the keyboard 132 at a first candela level when the determined light level is greater than the first level, and illuminating the keyboard 132 at a second candela level less than the first candela level when the determined light level is less than the first level. Further, the intensity adjusting step involves illuminating the keyboard 132 at a third candela level less than the second candela level when the determined light level is greater than the first level.

Figure 6:
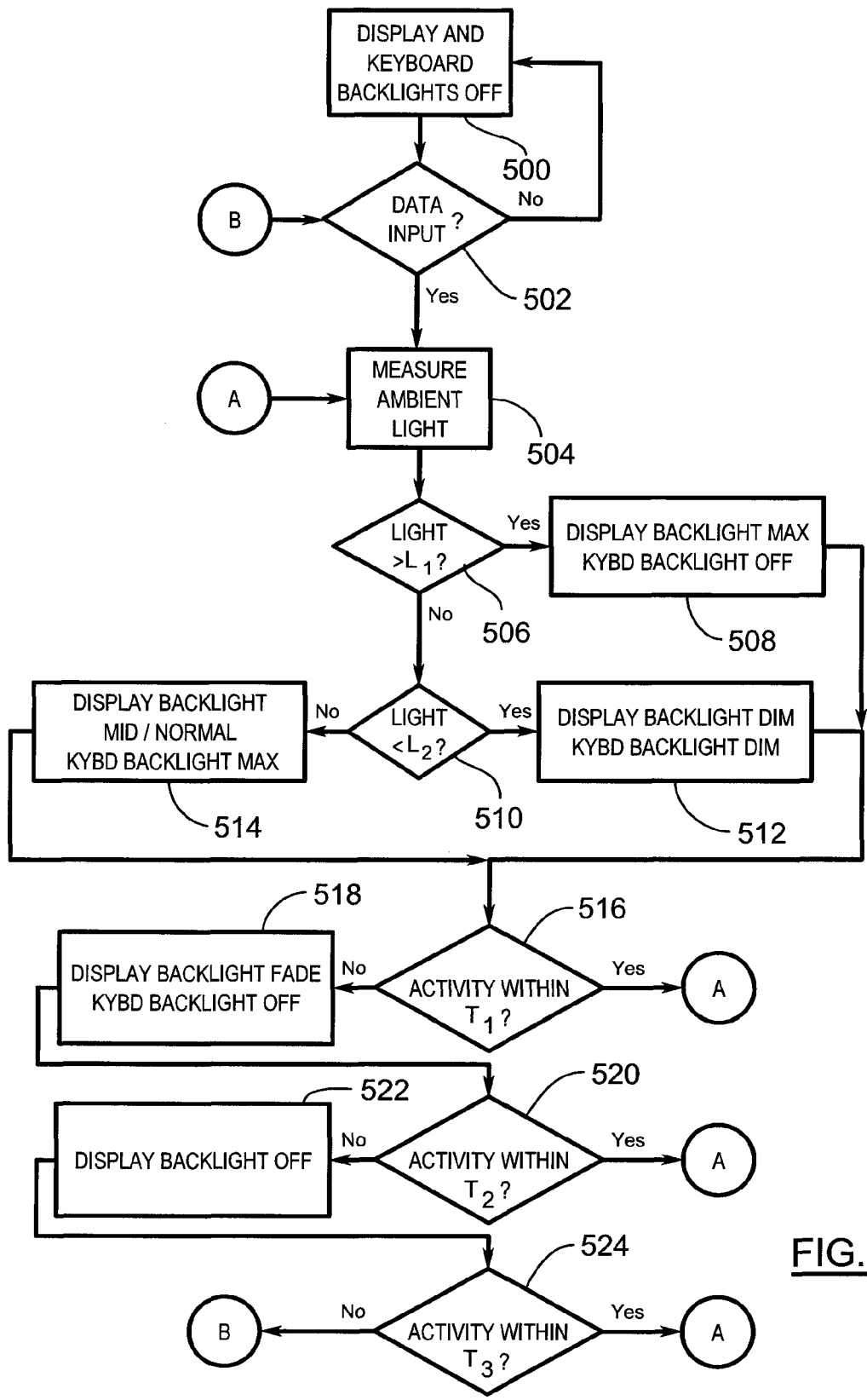
FIG. 6 is a flowchart depicting, in detail, the method of backlight control implemented in a version of the portable computing device in which the display is a transmissive backlit display.

FIG. 6 is a flow chart that depicts, in detail, the sequence of steps performed by the data processing means 102 on a portable computing device 100 having a transmissive or a trans-reflective LCD display 122.

Initially, at step 500, the portable computing device 100 is in an inactive state, such as a sleep state; and the display backlight 182 and the keyboard backlight 183 are at a minimum intensity, such as off.

At step 502, the data processing means 102 waits for activity on the data input means, such as by pressing a key on the keyboard 132, rotating the thumbwheel 148 or depressing the escape key 160. If the user of the portable computing device 100 activates the data input means the portable computing device 100 exits the inactive state, and processing transitions to step 504.

Alternately, in one variation, the data processing means 102 exits the inactive state in response to activity occurring on one of the computer programs 158. For instance, the data processing means 102 may exit the inactive state when an e-mail message or a telephone call is received on the portable computing device 100.

Typically, when the user depresses a key on the keyboard 132 or the escape key 160, the data processing means 102 processes the activity as a key stroke, and uses the key stroke as a data input to one of the computer programs 158. Further, typically when the user rotates or depresses the thumbwheel 148, the data processing means 102 processes the activity as a navigation input to the operating system or one of the computer programs 158. However, at step 502, since the activity on the data input means is used to exit the portable computing device 100 from the inactive state, the data processing means 102 suppresses the normal effect (data input, navigation input) of the activity.

At step 504, the light controller 184 determines the ambient light level at the portable computing device 100, via the ambient light sensor 162. At step 506, the light controller 184 compares the determined light level against a first predetermined threshold level. Typically, the first predetermined threshold level is intermediate an illumination level corresponding to exposure to sunlight, and an illumination level corresponding to dusk.

If the determined light level is greater than the first predetermined threshold level, at step 508 the light controller 184 sets the intensity of the display backlight 182 to a first intensity level. Preferably, the first intensity level is the "overdrive" intensity level of the display backlight 182. In addition, preferably the light controller 184 keeps the keyboard/keypad backlight 183 off.

If the determined light level is not greater than the first predetermined threshold level, at step 510 the light controller 184 compares the determined light level against a second predetermined threshold level. Typically, the second predetermined threshold level is intermediate the illumination level corresponding to dusk, and an illumination level corresponding to night.

If the determined light level is less than the second predetermined threshold level, at step 512 the light controller 184 sets the intensity of the display backlight 182 to a third intensity level. Typically, the third intensity level is a dim backlight intensity that is slightly greater than the minimal/off intensity level. The dim backlight intensity is sufficient to allow the information displayed on the display 122 to be viewed at night, without "blinding" the user of the portable computing device 100.

In addition, preferably the light controller 184 sets the intensity of the keyboard/keypad backlight 183 to a dim keyboard intensity (brighter than off). As above, the dim keyboard intensity is sufficient to allow the key identifier information printed on the keys to be viewed at night, without "blinding" the user of the portable computing device 100.

However, if the determined light level is not less than the second predetermined threshold level (but is less than the first predetermined threshold level), at step 514 the light controller 184 sets the intensity of the display backlight 182 to a second intensity level. Typically, the second intensity level is the normal intensity level, and is intermediate the first (overdrive) backlight intensity and the third (dim) backlight intensity. The second backlight intensity is sufficient to allow the information displayed on the display 122 to be viewed at dusk, again without "blinding" the user of the portable computing device 100.

In addition, preferably the light controller 184 sets the intensity of the keyboard/keypad backlight 183 to a bright backlight intensity (typically the maximum backlight intensity).

Thereafter, at step 516, the data processing means 102 waits a first predetermined time period for activity at the data input means (eg. pressing a key on the keyboard 132, rotating the thumbwheel 148 or depressing the escape key 160) or for an e-mail message or a telephone call being received on the portable computing device 100. If the data processing means 102 detects such activity within the first predetermined time period (typically about 10 seconds), processing returns to step 504.

However, if the first predetermined time period expires without any such activity, at step 518 the light controller 184 begins to gradually reduce the intensity of the display backlight 182, so as to provide a warning to the user of the portable computing device 100 that the display backlight is about to be turned off. In addition, preferably the light controller 184 also turns off the keyboard backlight 183.

Thereafter, at step 520, the data processing means 102 waits a second predetermined time period for activity at the data input means or for an e-mail message or a telephone call being received on the portable computing device 100. If the data processing means 102 detects such activity within the second predetermined time period (typically about 15 seconds), processing returns to step 504.

However, if the second predetermined time period expires without any such activity, at step 522 the light controller 184 turns off the display backlight 182.

Thereafter, at step 524, the data processing means 102 waits a third predetermined time period for activity at the data input means or for an e-mail message or a telephone call being received on the portable computing device 100. If the data processing means 102 detects such activity within the third predetermined time period (typically about 60 seconds), processing returns to step 504.

However, if the third predetermined time period expires without any such activity, at step 526 processing returns to step 502 and the portable computing device 100 returns to the inactive/sleep state.

Figure 7:
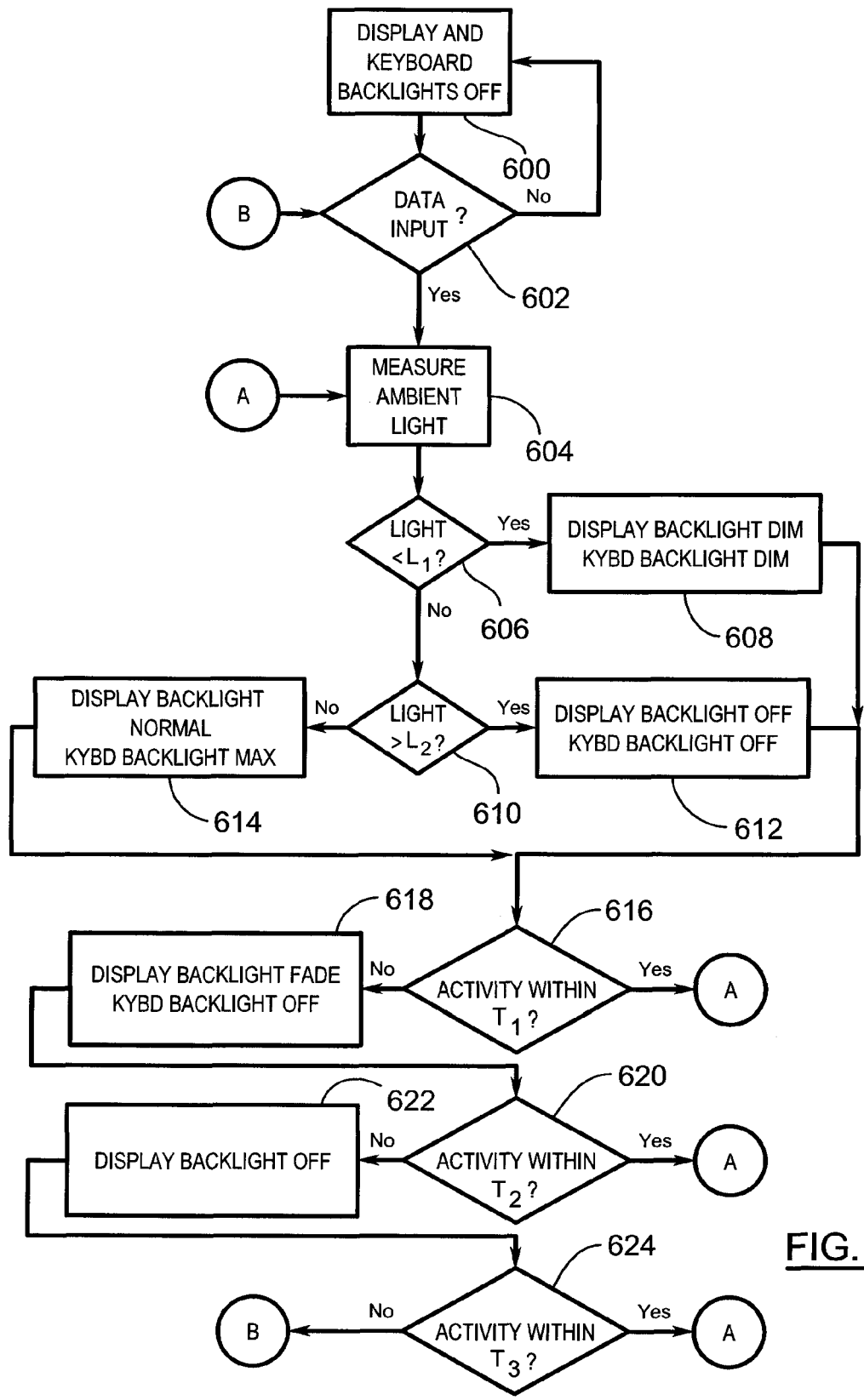
FIG. 7 is a flowchart depicting, in detail, the method of backlight control implemented in a version of the portable computing device in which the display is a reflective or transreflective backlit display.

FIG. 7 is a flow chart that depicts, in detail, the sequence of steps performed by the light controller 184 on a portable computing device 100 having a reflective or a trans-reflective LCD display 122.

Initially, at step 600, the portable computing device 100 is in an inactive state, such as a sleep state; and the display backlight 182 and the keyboard backlight 183 are at a minimum intensity, such as off.

At step 602, the data processing means 102 waits for activity on the data input means, such as by pressing a key on the keyboard 132, rotating the thumbwheel 148 or depressing the escape key 160. If the user of the portable computing device 100 activates the data input means the portable computing device 100 exits the inactive state, and processing jumps to step 604.

Typically, when the user depresses a key on the keyboard 132 or the escape key 160, the data processing means 102 processes the activity as a key stroke, and uses the key stroke as a data input to one of the computer programs 158. Further, typically when the user rotates or depresses the thumbwheel 148, the data processing means 102 processes the activity as a navigation input to the operating system or one of the computer programs 158. However, at step 602, since the activity on the data input means is used to exit the portable computing device 100 from the inactive state, the data processing means 102 suppresses the normal effect (data input, navigation input) of the activity.

At step 604, the light controller 184 determines the ambient light level at the portable computing device 100, via the ambient light sensor 162. At step 606, light controller 184 compares the determined light level against a first predetermined threshold level. Typically, the first predetermined threshold level is intermediate an illumination level corresponding to dusk, and an illumination level corresponding to night.

If the determined light level is less than the first predetermined threshold level, at step 608 the light controller 184 sets the intensity of the display backlight 182 to a second intensity level. Typically, the second intensity level is a dim backlight intensity that is slightly greater than the minimal/off intensity level. The dim backlight intensity is sufficient to allow the information displayed on the display 122 to be viewed at night, without "blinding" the user of the portable computing device 100.

In addition, preferably the light controller 184 sets the keyboard/keypad backlight intensity 183 to a dim keyboard intensity (brighter than off). As above, the dim keyboard intensity is sufficient to allow the key identifier information printed on the keys to be viewed at night, without "blinding" the user of the portable computing device 100.

If the determined light level is not less than the first predetermined threshold level, at step 610 the light controller 184 compares the determined light level against a second predetermined threshold level. Typically, the second predetermined threshold level is intermediate an illumination level corresponding to exposure to sunlight, and the illumination level corresponding to dusk.

If the determined light level is greater than the second predetermined threshold level, at step 612 the light controller 184 sets the intensity of the display backlight 182 to a third intensity level. Typically, the third intensity level is the minimal/off intensity level. In addition, preferably the data processing means 102 turns off the keyboard/keypad backlight 183.

However, if the determined light level is not greater than the second predetermined threshold level (but is not less than the first predetermined threshold level), at step 614 the light controller 184 sets the intensity of the display backlight 182 to a first intensity level. Typically, the first intensity level is the normal backlight intensity. The first backlight intensity is sufficient to allow the information displayed on the display 122 to be viewed at dusk, again without "blinding" the user of the portable computing device 100.

In addition, preferably the light controller 184 sets the intensity of the keyboard/keypad backlight 183 to a bright backlight intensity (typically the maximum backlight intensity).

Thereafter, at step 616, the data processing means 102 waits a first predetermined time period for activity at the data input means (eg. pressing a key on the keyboard 132, rotating the thumbwheel 148 or depressing the escape key 160) or for an e-mail message or a telephone call being received on the portable computing device 100. If the data processing means 102 detects such activity within the first predetermined time period (typically about 10 seconds), processing returns to step 604.

However, if the first predetermined time period expires without any such activity, at step 618 the light controller 184 begins to gradually reduce the intensity of the display backlight 182, so as to provide a warning to the user of the portable computing device 100 that the display backlight 182 is about to be turned off. In addition, preferably the light controller 184 also turns off the keyboard backlight 183.

Thereafter, at step 620, the data processing means 102 waits a second predetermined time period for activity at the data input means or for an e-mail message or a telephone call being received on the portable computing device 100. If the data processing means 102 detects such activity within the second predetermined time period (typically about 15 seconds), processing returns to step 604.

However, if the second predetermined time period expires without any such activity, at step 622 the light controller 184 turns off the display backlight 182.

Thereafter, at step 624, the data processing means 102 waits a third predetermined time period for activity at the data input means or for an e-mail message or a telephone call being received on the portable computing device 100. If the data processing means 102 detects such activity within the third predetermined time period (typically about 60 seconds), processing returns to step 604.

However, if the third predetermined time period expires without any such activity, processing returns to step 602 and the portable computing device 100 returns to the inactive/sleep state.

Variations on the foregoing embodiments are envisaged. For instance, in one variation, rather than the first, second and third intensity levels being fixed, the data processing means 102 allows the user of the portable computing device 100 to set the intensity levels through the data input means (such as through the keyboard 132 or the thumbwheel 148). In another variation, rather than the first and second threshold levels being fixed, the data processing means 102 allows the user of the portable computing device 100 to set the threshold levels through the data input means (such as through the keyboard 132 or the thumbwheel 148).

In yet another variation, the light controller 184 allows the user to turn the display backlight on or off, by momentarily depressing and releasing the function key 146. In still another variation, the light controller 184 allows the user to cycle through each combination of display backlight intensity level and keyboard backlight intensity level by momentarily depressing and releasing the function key 146. In other variation, the light controller 184 allows the user to terminate the automatic dimming (at steps 518, 618) by momentarily depressing and releasing the function key 146.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A controller system for a first backlight for a display device and a second backlight for data entry device of a computing device, the controller system comprising:
    a light sensor for determining an ambient light level at the computing device; and
    a light controller coupled to the display device, the light sensor, the first backlight, and
    when the display device is a transmissive display device, the light controller being configured to set the intensity of light emitted by the first backlight to
        a first intensity when the ambient light level is greater than a first threshold that is intermediate a dusk illumination level and a sunlight illumination level, the first intensity is an overdrive intensity being greater than a normal intensity having a time to half brightness greater than an expected mean time between failure for the computing device,
        a second intensity when the ambient light level is not greater than the first threshold, the second intensity being less than the first intensity, and
        a third intensity less than the second intensity when the ambient light level is less than a second threshold, the third intensity is a dim intensity level being slightly greater than a minimal/off intensity, the second threshold being less than the first threshold and is intermediate the dusk illumination level and a night illumination level,
    when the display device is a reflective or trans-reflective display device, the light controller being configured to set the intensity of light emitted by the first backlight to
        a fourth intensity when the ambient light level is less than a fourth threshold that is intermediate the dusk illumination level and the night illumination level, the fourth intensity being the dim intensity level,
        a fifth intensity that is the minimal/off intensity when the ambient light level is not less than the fourth threshold and is greater than a fifth intensity level, the fifth threshold being intermediate the dusk illumination level and a sunlight illumination level, and
        a sixth intensity that is the normal intensity when the ambient light level is not greater than the fifth threshold and is not less than the fourth intensity level, the fifth threshold being intermediate the dusk illumination level and a sunlight illumination level, and
    the light controller further being coupled to the second backlight and being further configured to control the second backlight independently of the first backlight, and
    when the display device is the transmissive display device, the light controller being configured to set an intensity of light emitted by the second backlight to
        off, when the ambient light level is greater than the first threshold,
        a dim keyboard intensity level that is slightly greater an a minimal/off keyboard intensity level, when the ambient light level is less than the second threshold, and
        a bright keyboard intensity level that is at the maximum keyboard intensity level, when the ambient light level is not less than the second threshold and
    when the display device is the reflective or trans-reflective display device, the light controller being configured to set the intensity of light emitted by the second backlight to
        the dim keyboard intensity, when the ambient light level is less than the fourth threshold,
        the minimal/off keyboard intensity level when the ambient light level is not less than the fourth threshold and is greater than the fifth intensity level, and
        the bright keyboard intensity level, when the ambient light level is not greater than the fifth threshold and is not less than the fourth intensity level.

2. The controller system according to claim 1, wherein:
    the light controller is configured to gradually reduce the intensity of light emitted by the first backlight after a period of inactivity at the computing device.

3. In a computing device that includes a first backlight for a display device, a second backlight for a data entry device, a light sensor and a light controller coupled to the light sensor and the first and second backlights, a method for controlling the intensity of light of the first and the second backlights, comprising:

determining an ambient light level at the computing device using data from the light sensor; and when the display device is a transmissive display device, setting the intensity of light emitted by the first backlight to a first intensity when the ambient light level is greater than a first threshold that is intermediate a dusk illumination level and a sunlight illumination level, the first intensity is an overdrive intensity being greater than a normal intensity having a time to half brightness greater than an expected mean time between failure for the computing device, a second intensity when the ambient light level is not greater than the first threshold, the second intensity being less than the first intensity, and a third intensity less than the second intensity when the ambient light level is less than a second threshold, the third intensity is a dim intensity level being slightly greater than a minimal/off intensity, the second threshold being less than the first threshold and is intermediate the dusk illumination level and a night illumination level, when the display device is a reflective or trans-reflective display device, setting the intensity of light emitted by the first backlight to a fourth intensity when the ambient light level is less than a fourth threshold that is intermediate the dusk illumination level and the night illumination level, the fourth intensity being the dim intensity level, a fifth intensity that is the minimal/off intensity when the ambient light level is not less than the fourth threshold and is greater than a fifth intensity level, the fifth threshold being intermediate the dusk illumination level and a sunlight illumination level, and a sixth intensity that is the normal intensity when the ambient light level is not greater than the fifth threshold and is not less than the fourth intensity level, the fifth threshold being intermediate the dusk illumination level and a sunlight illumination level, when the display device is the transmissive display device, setting an intensity of light emitted by the second backlight to off, when the ambient light level is greater than the first threshold, a dim keyboard intensity level that is slightly greater an a minimal/off keyboard intensity level, when the ambient light level is less than the second threshold, and a bright keyboard intensity level that is at the maximum keyboard intensity level, when the ambient light level is not less than the second threshold and when the display device is the reflective or trans-reflective display device, setting the intensity of light emitted by the second backlight to the dim keyboard intensity, when the ambient light level is less than the fourth threshold, the minimal/off keyboard intensity level when the ambient light level is not less than the fourth threshold and is greater than the fifth intensity level, and the bright keyboard intensity level, when the ambient light level is not greater than the fifth threshold and is not less than the fourth intensity level.

4. The method according to claim 3, wherein setting an intensity of light produced by the first backlight further comprises:

gradually reducing the intensity of light produced by the first backlight after a period of inactivity at the computing device.

5. The method according to claim 3, wherein one of the thresholds and/or intensities is user-configurable.

6. The method according to claim 3, wherein the dim light level is sufficient to allow information to displayed on the display device to be viewed at night.

7. The method according to claim 3, further comprising:

waiting for a first predetermined time period for activity at an data input means of the computing device after setting the intensity of light produced by the first backlight; and if the first predetermined time period expires without detection of the activity, then reducing the intensity of light produced by the first backlight.

8. The method according to claim 7, further comprising:

after reducing the intensity of light, waiting for a second predetermined time period for activity at the data input means or for receipt of either an e-mail message or a telephone call by the computing device; and if the second predetermined time period expires without detection of the activity or receipt of either the e-mail message or the telephone call by the computing device, then turning off the first backlight.

9. A non-transitory computer-readable medium including computer processing instructions for a processing unit of a computing device, the computing device including a display having a first backlight and a data entry device having a second backlight, the computer processing instructions when executed by the processing unit causing the computing device to:

determine an ambient light level at the computing device;

when the display device is a transmissive display device, set the intensity of light emitted by the first backlight to a first intensity when the ambient light level is greater than a first threshold that is intermediate a dusk illumination level and a sunlight illumination level, the first intensity is an overdrive intensity being greater than a normal intensity having a time to half brightness greater than an expected mean time between failure for the computing device, a second intensity when the ambient light level is not greater than the first threshold, the second intensity being less than the first intensity, and a third intensity less than the second intensity when the ambient light level is less than a second threshold, the third intensity is a dim intensity level being slightly greater than a minimal/off intensity, the second threshold being less than the first threshold and is intermediate the dusk illumination level and a night illumination level, when the display device is a reflective or trans-reflective display device, set the intensity of light emitted by the first backlight to a fourth intensity when the ambient light level is less than a fourth threshold that is intermediate the dusk illumination level and the night illumination level, the fourth intensity being the dim intensity level, a fifth intensity that is the minimal/off intensity when the ambient light level is not less than the fourth threshold and is greater than a fifth intensity level, the fifth threshold being intermediate the dusk illumination level and a sunlight illumination level, and a sixth intensity that is the normal intensity when the ambient light level is not greater than the fifth threshold and is not less than the fourth intensity level, the fifth threshold being intermediate the dusk illumination level and a sunlight illumination level, when the display device is the transmissive display device, set an intensity of light emitted by the second backlight, independently of the first backlight, to off, when the ambient light level is greater than the first threshold, a dim keyboard intensity level that is slightly greater an a minimal/off keyboard intensity level, when the ambient light level is less than the second threshold, and a bright keyboard intensity level that is at the maximum keyboard intensity level, when the ambient light level is not less than the second threshold and when the display device is the reflective or trans-reflective display device, set the intensity of light emitted by the second backlight to the dim keyboard intensity, when the ambient light level is less than the fourth threshold, the minimal/off keyboard intensity level when the ambient light level is not less than the fourth threshold and is greater than the fifth intensity level, and the bright keyboard intensity level, when the ambient light level is not greater than the fifth threshold and is not less than the fourth intensity level.

* * * * *